United States Patent [19]

Tanaka et al.

[11] Patent Number: 4,620,236
[45] Date of Patent: Oct. 28, 1986

[54] IMAGE PICTURE READING DEVICE

[75] Inventors: Seiichi Tanaka, Osaka; Fumikazu Nagano, Yamatokoriyama, both of Japan

[73] Assignee: Sharp Kabushiki Kaisha, Osaka, Japan

[21] Appl. No.: 796,156

[22] Filed: Nov. 8, 1985

[30] Foreign Application Priority Data

Nov. 9, 1984 [JP] Japan ............................. 59-237115

[51] Int. Cl.$^4$ ............................................. H04N 1/02
[52] U.S. Cl. ................................... 358/293; 358/280
[58] Field of Search ............... 358/280, 293, 285, 287, 358/75, 294

[56] References Cited

U.S. PATENT DOCUMENTS

| 3,919,464 | 11/1975 | Kondoh | 358/293 |
|---|---|---|---|
| 4,002,829 | 1/1977 | Hutchinson | 358/293 |
| 4,288,821 | 9/1981 | Lavallee | 358/293 |
| 4,321,629 | 3/1982 | Ogasawara | 358/293 |
| 4,352,128 | 9/1982 | Ohori | 358/293 |
| 4,400,740 | 8/1983 | Traino | 358/293 |
| 4,454,547 | 6/1984 | Yip et al. | 358/293 |
| 4,500,927 | 2/1985 | Ozawa | 358/293 |
| 4,502,081 | 2/1985 | Otsuka | 358/280 |
| 4,547,813 | 10/1985 | McGraw | 358/293 |
| 4,566,041 | 1/1986 | Shimano | 358/287 |

FOREIGN PATENT DOCUMENTS 0032615 3/1977 Japan ............................. 358/293

Primary Examiner—Carl Stuart Miller
Attorney, Agent, or Firm—Birch, Stewart, Kolasch and Birch

[57] ABSTRACT

In an image picture reading device having a light source to irradiate an original copy, a series of sensors arranged in a line for detecting densities of small areas of the original copy by light reflected from the original copy, a reading circuit for sequentially outputting signals for the densities for the small areas of the original copy, and a buffer for storing and outputting the density signals sequentially received from the reading circuit, the buffer being reset for the initial state at constant intervals, the image picture reading device includes a setting unit for a resolution "K" value of the reading device, a buffer control unit for setting a reset pulse cycle for the buffer at a period for which picture density signals are accumulated to the quantity of "k" corresponding to the "K" value input by the setting unit, a light source control circuit for controlling the light amount of the light source, and a control unit for setting the light source control circuit so as to control the light amount to 1/k according to the "K" value set by the setting unit.

1 Claim, 3 Drawing Figures

4,620,236

IMAGE PICTURE READING DEVICE

BACKGROUND OF THE INVENTION

The present invention relates to an image picture reading device for use in a color scanner. Various methods have been proposed recently to meet the demand for higher resolution degree of an image picture reading device. Consequently, resolution has been remarkably improved. In some cases, however, quicker reading capability with a moderate resolution degree may be required. Picture element thinning, hardware analog or digital equalization of picture elements or software digital equalization of picture elements is a conventional method proposed to meet such a requirement.

The picture element thinning method, in which picture elements are thinned regardless of surrounding picture elements, does not effect true reading resolution because of unequalized copy density.

Hardware analog or digital equalization of picture elements involves an equalization circuit, resulting in very complicated circuitry construction.

Software digital equalization of picture elements disables real time processing.

SUMMARY OF THE INVENTION

In view of the foregoing, it is the object of the present invention to provide an image picture reading device with simplified circuitry construction which realizes resolution conversion by picture element equalization as well as enables real time processing at a low resolution degree.

Other objects and further scope of applicability of the present invention will become apparent from the detailed description given hereinafter. It should be understood, however, that the detailed description of and specific examples, while indicating preferred embodiments of the invention, are given by way of illustration only, since various changes and modifications within the spirit and scope of the invention will become apparent to those skilled in the art from this detailed description.

In brief, the image picture reading device of the present invention comprises means for a setting K value for the resolution degree of the image picture reading device, buffer control means for a reset pulse cycle for a buffer at a period for which picture density signals are accumulated to the quantity of "k" corresponding to "K" set by the resolution degree setting means, a light source control circuit for controlling the amount of light from a light source, and control means for setting the light source control circuit so as to control the light amount to 1/k according to the "K" value set by the resolution degree setting means.

BRIEF DESCRIPTION OF THE DRAWINGS

The present invention will be better understood from the detailed description given hereinbelow and the accompanying drawings which are given by way of illustration only, and thus are not limitative of the present invention in which.

DESCRIPTION OF THE PREFERRED EMBODIMENT

Figure 1:
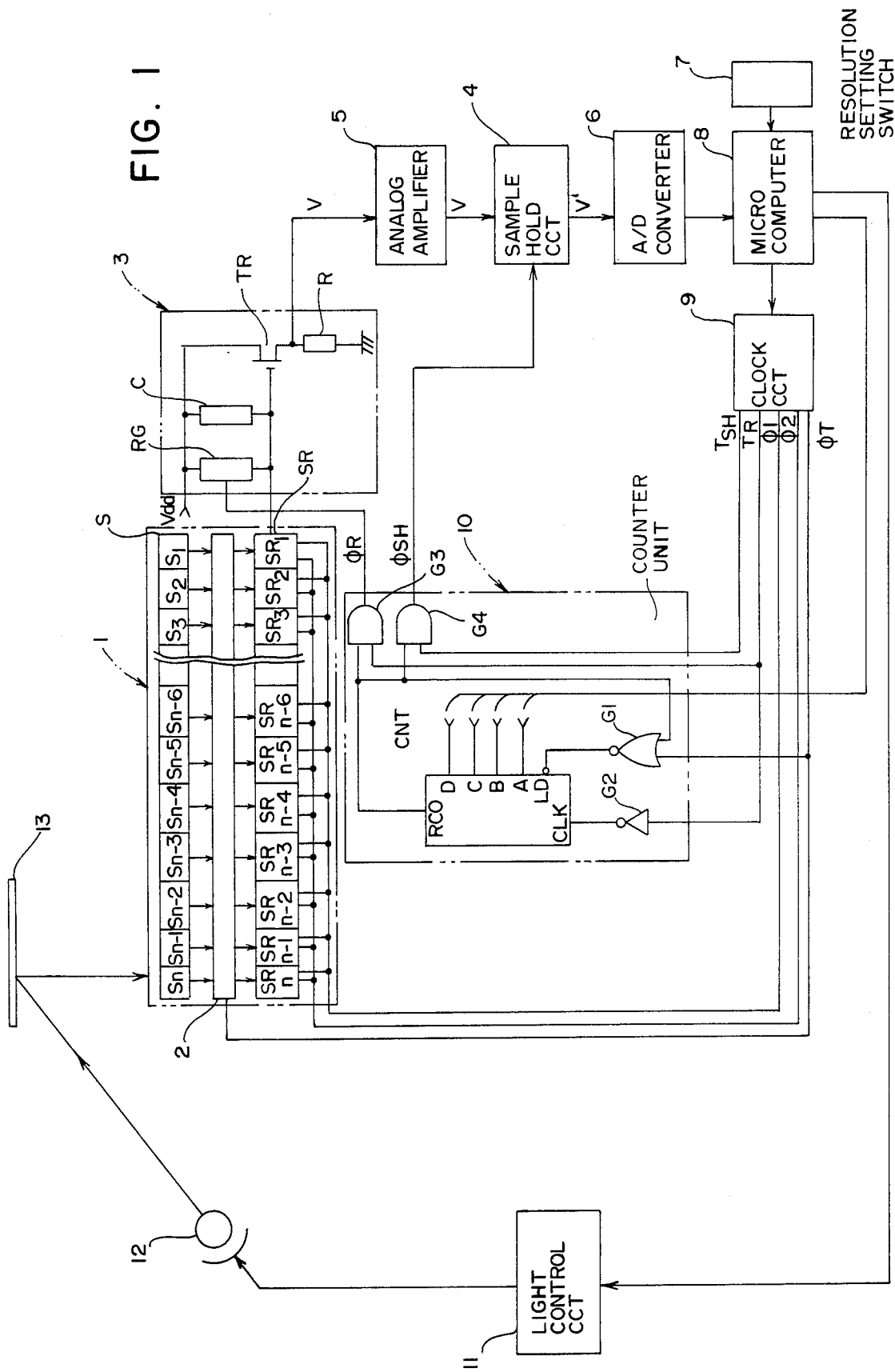
FIG. 1 is a block diagram showing an embodiment of an image picture reading device of the present invention.

FIG. 1 is a block diagram showing an embodiment of an image picture reading device of the present invention.

A sensor block 1 is composed of a sensor S, a transfer gate 2 and a shift register SR. The shift register SR which is a reading circuit is connected to a buffer 3. The sensor S contains "n" CCD's arranged in a line at a position corresponding to an original copy 13. The sensor S composed of "n" CCD's senses a light reflected from the original copy 13 and conducts photoelectric conversion. The original copy 13 is irradiated by light from a light source 12 whose light amount is controlled by a light source control circuit 11.

The transfer gate 2 opens by a transfer pulse $\phi_T$ so that original copy density signals read by the sensor S are transferred to the shift register SR which is composed of "n" registers corresponding to the "n" CCD's. By shift clocks $\phi_1$ and $\phi_2$, the shift register SR outputs the density signals sequentially from the rightmost register device in FIG. 1 to a buffer 3.

The buffer 3 is composed of a floating capacitor C, a MOS transister TR, a load resistance R and a reset gate RG. It stores density signal inputs from the shift register SR in the floating capacitor C in form of electric charge. The floating capacitor C is inserted between the gate and the drain of the MOS transister TR to control current flowing between the source and the drain of the MOS transistor TR. Using, using electric chare "q" stored in the floating capacitor C, voltage is dropped by $v = q/C$, and the resultant voltage is taken out as an output V after being transformed into a signal by a source follower with the load resistance R connected on the source side of the MOS transistor TR.

The output from the MOS transistor TR enters an analog amplifier 5. The reset gate RG is connected in parallel with the floating capacitor C. The reset gate RG opens by a reset pulse $\phi_R$ (which is described later) so that the floating capacitor C initiates electric discharge for resetting.

The signal output V from the buffer 3 enters the analog amplifier 5 that contains an operational amplifier for amplification, with amplification factor $\mu$ and then enters a sample hold circuit 4. The sample hold circuit 4 sample-holds the output V' from the analog amplifier 5 by a sample pulse $\phi_{SH}$ which will be later described. The density signal V' sample-held by the sample hold circuit 4 is sent to an A/D converter 6 to be converted to digital data and input into a micro computer 8.

Figure 3:
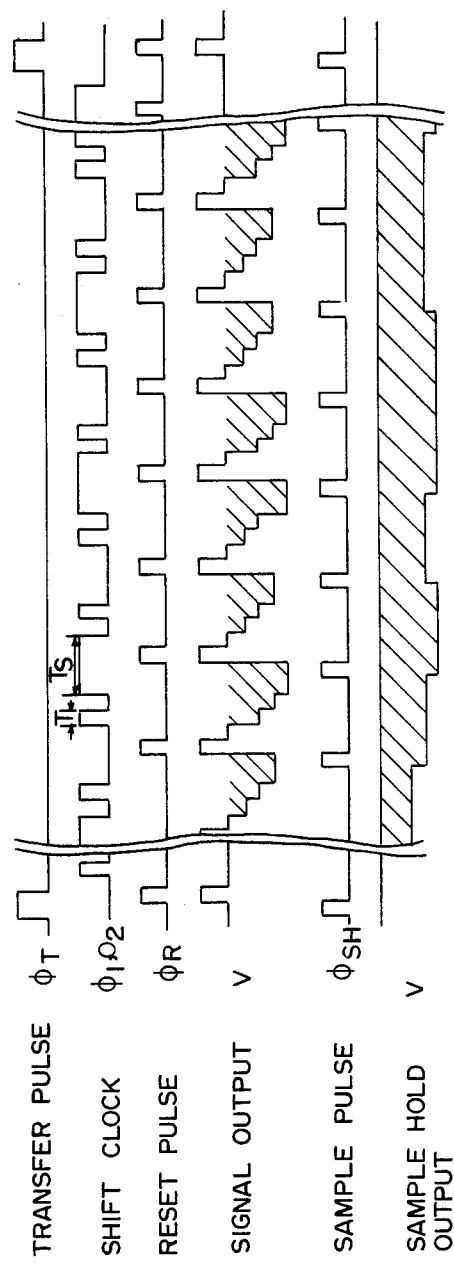
FIG. 3 is a timing chart for the embodiment of FIG. 1.

A clock circuit 9 outputs a transfer pulse $\phi_T$, shift clocks $\phi_1$ and $\phi_2$, a sample clock $T_{SH}$ and a reset clock $T_R$, in accordance with control by the micro computer 8. The transfer pulse $\phi_T$ is outputted prior to the other clocks each time the sensor S detects copy density. The shift clocks $\phi_1$ and $\phi_2$ are combinations of clock widths T and Ts, as shown in FIG. 3. The sample clock $T_{SH}$ is used to form a sample pulse $\phi_{SH}$, and the reset clock $T_R$ to form a reset pulse $\phi_R$.

The shift clocks $\phi_1$ and $\phi_2$ are outputted to the shift register SR, the transfer pulse $\phi_T$ to the transfer gate 2 and the gate G1 of a counter unit 10, the reset clock $T_R$ to the gate G2 of the counter unit 10, and the sample clock $T_{SH}$ to the gate G4 of the counter unit 10.

The counter unit 10 is composed of a counter CNT and the gates G1, G2, G3 and G4. The counter CNT is a binary four-digit counter and therefore overflows when counting to 16.

The micro computer 8 conducts prescribed arithmetic operations based on the "K" value (K =2, 3, 4, 6, 12, etc.) set, for the resolution of the reading device, by a resolution setting switch 7. The operation result (preset value) is then input from the micro computer 8 to the counter CNT through terminals A, B, C and D. The thus input preset value is multiplied by a count pulse (reversed reset clock $T_R$) input through a clock input terminal CLK. When the products overflow, "H" is outputted from a terminal RCO. The preset value is determined by the resolution value "K". Supposing preset initial value is "m", the value for "m" is obtained by the expression, 16−k. (16 is the maximum count of the counter CNT.) The load terminal LD of the counter CNT is connected with the gate G1 through which a transfer pulse $\phi_T$ and the output from the terminal RCO are input. The gate G1 outputs "L" every time either of the above inputs is "H", so that the preset value "m" is preset in the counter CNT. Reversed reset clock $T_R$ is supplied through the gate G2 to the clock input terminal CLK. The gate G3 is an AND gate through which the reset clock $T_R$ and the output from the terminal RCO are input. This gate outputs "H" when both of the above inputs are "H". The gate G4 is also an AND gate through which sample clock $T_{SH}$ and the output from the terminal RCO are input. This gate outputs "H" when both of the above inputs are "H". The output from the gate G3 is supplied to the reset gate RG, and the output from the gate G4 to the sample hold circuit 4.

In other words, the counter block 10 constitutes a buffer control means for setting the cycle of reset pulse $\phi_R$ which resets the buffer 3 at a period for which picture density signals (outputs from the shift register SR) are accumulated to the quantity of "k" corresponding to the value "K" set by the resolution setting switch 7.

In addition to the arithmetic operation of the preset value for the counter CNT based on the resolution value "K" set by the setting switch 7, the micro computer 8 controls the light source control circuit 11 to adjust the light amount of the light source 12 to 1/k in accordance with the "K" resolution setting. Namely, the light amount is adjusted to 1/k so that the light amount in accordance with the "K" resolution setting is introduced into the sensor 1. Accordingly, the outputs from the sensor 1 and the A/D converter 6 will not change with "K" resolution setting if the copy density is identical.

The operation of the micro computer 8 for controlling light amount of the light source 12 is specifically described below.

Figure 2:
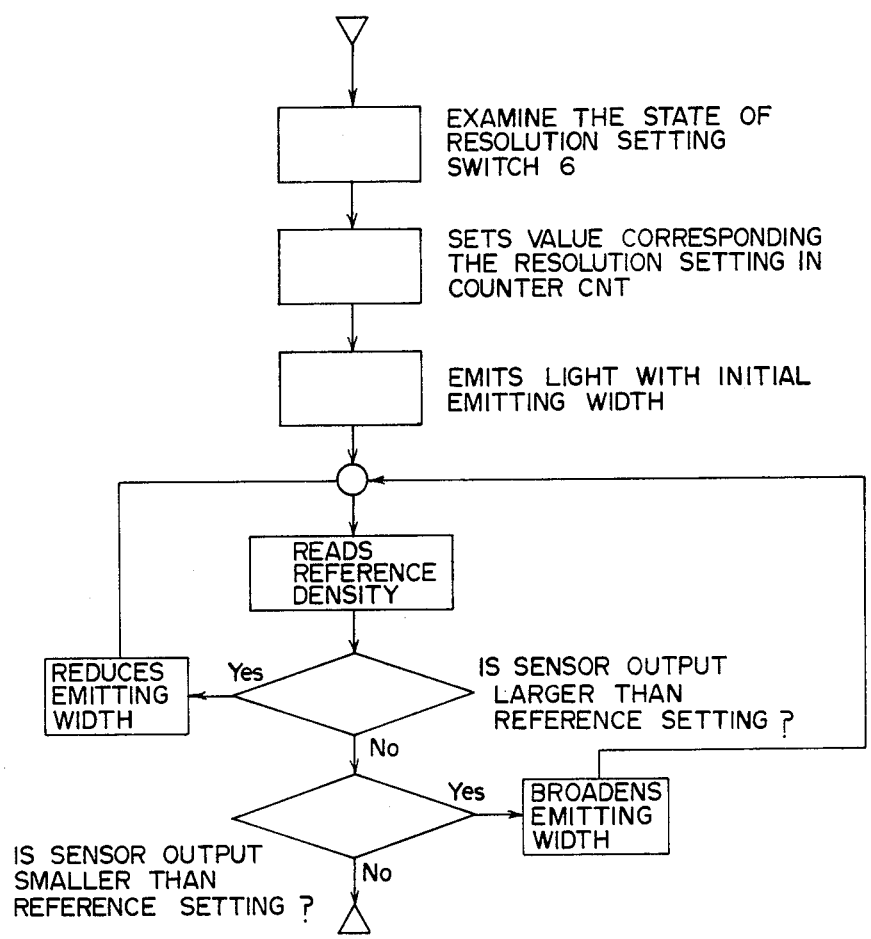
FIG. 2 is a flow chart showing the sequence of light amount control in accordance with resolution degree.

FIG. 2 shows the control flow. In this embodiment, pulse width is controlled for adjustment of light amount. The light amount is also adjustable by controlling the driving voltage of the light source.

When a certain "K" value (for instance K =3) is input for the resolution by the resolution setting switch 7, the micro computer 8 calculates a preset value corresponding to the resolution "3" and inputs the calculated preset value in the counter CNT.

Then, the micro computer 8 gives a driving instruction to the light source control circuit 11 so that the light source 12 emits light. Based on the comparison of the output from the A/D converter 6 actuated by this initial emission with a reference A/D conversion output (reference value), the micro computer 8 outputs a pulse width (emitting width)-controlling signal to the light source control circuit 11. If the obtained output is larger than the reference value, a signal is output to reduce the pulse width. On the contrary, if the obtained output is smaller than the reference value, a signal is output to broaden the pulse width. Thus, this control is continued until the output from the A/D converter 6 becomes equal to the reference value.

Owing to this light amount control by the micro computer 8, the outputs from the sensor 1 and the A/D converter 6 will not change with resolution "K" value, providing that the copy density is the same.

Operation of the image picture reading device shown in FIG. 1 will now be described with reference to the timing chart of FIG. 3.

When the resolution "K" is set by the resolution setting switch 7, the "K" setting is input in the micro computer 8. Then, the micro computer 8 executes a control operation according to the flow chart of FIG. 2, to obtain the light amount corresponding to the "K" setting.

Upon completion of the light amount adjustment, actual copy reading operation starts.

First, the initial value "m" is preset in the counter CNT. Then, the sensor S starts detecting the density of a very small area of the original copy. The clock circuit 9 outputs a transfer pulse $\phi_T$ to transfer the density signal to the shift register SR. Simultaneously, the counter CNT starts counting by reset clocks $T_R$. The clock circuit 9 then outputs shift clocks $\phi_1$ and $\phi_2$ so that signal outputs from the shift register SR are sequentially stored in the floating capacitor C. When the outputs have been stored to the quantity of "k", the counter block 10 outputs sample pulse $\phi_{SH}$ so that the sample hold circuit sample-holds the signal output V' of the analog amplifier 5. That is, when data are accumulated up to the quantity of "k" in the floating capacitor C, the reset clock $T_R$ should have been output "k" time. The counter CNT therefore overflows and outputs "H" from the terminal RCO. Accordingly, sample pulse $\phi_{SH}$ is output from the gate G4 to initiate the sample-holding operation. Simultaneously, reset pulse $\phi_R$ is output from the gate G3 to reset the floating capacitor C. The output V from the sample hold circuit is then sent into the A/D converter 6.

The above operation is repeated until the density signal from every shift register has been shifted.

With the above operation, it is possible to change resolution degree without picture element thinning but instead the resolution degree is based on the mean density of a plurality of picture elements.

With 12 dots/mm CCD's, the resolution degrees of 6, 4, 3, 2 and 1 dots/mm are obtained by setting the resolution "K" value at k =2, 3, 4, 6 and 12, respectively, by the resolution setting switch 7.

According to the present invention, as understood from the above description, resolution "K" value is first set and input for the reading device, the light amount of the light source is adjusted to 1/k according to the above "K" setting, and the reset pulse cycle for the buffer is set at the "K" value. Consequently, the reading device of the present invention does not require intricate hardware or software means for picture element equalization, and therefore is very simple in the circuit construction. Moreover, real time processing is possible even at a lower resolution, because equalization by software means is not necessary.

While only certain embodiments of the present invention have been described, it will be apparent to those skilled in the art that various changes and modifications may be made therein without departing from the spirit and scope of the present invention as claimed.

What is claimed is:

1. An image picture reading device having a light source to irradiate an original copy, a series of sensors arranged in a line for detecting densities of small areas of said original copy by light reflected from the original copy, a reading circuit for sequentially outputting signals for the densities detected by said sensors for the small area of the original copy, and a buffer for storing and outputting the density signals sequentially received from said reading circuit, said buffer being reset for an initial state at constant intervals, said image picture reading device, comprising:

setting means for inputting a resolution "K" value for said reading device;

buffer control means for setting a reset pulse cycle for said buffer at a period for which picture density signals are accumulated to the quantity of "k" corresponding to the "k" value input by said setting means;

a light source control circuit for controlling the light amount of said light source; and control means for setting the light source control circuit so as to control the light amount to 1/k according to the "k" value set by said setting means.

* * * * *